United States Patent [19]

Barsotti et al.

[11] Patent Number: 5,376,706
[45] Date of Patent: Dec. 27, 1994

[54] ANHYDRIDE EPOXY COATING COMPOSITION MODIFIED WITH A SILANE POLYMER

[75] Inventors: Robert J. Barsotti, Franklinville, N.J.; Jeffery W. Johnson, Rochester Hills, Mich.

[73] Assignee: E. I. Du Pont de Nemours and Company, Wilmington, Del.

[21] Appl. No.: 977,865

[22] Filed: Nov. 17, 1992

[51] Int. Cl.$^5$ .................. C08K 5/01; C09D 133/06; C09D 143/04; C09D 163/00
[52] U.S. Cl. ..................... 523/434; 523/435; 523/455; 525/101
[58] Field of Search ............. 523/423, 455, 434; 525/101

[56] References Cited

U.S. PATENT DOCUMENTS

| | | | |
|---|---|---|---|
| 4,871,806 | 10/1989 | Shalati | 525/111 |
| 4,906,677 | 3/1990 | Barsotti | 523/437 |
| 5,039,385 | 8/1991 | Tominaga | 523/425 |
| 5,057,555 | 10/1991 | White | 523/439 |
| 5,069,767 | 12/1991 | Tominaga | 523/425 |
| 5,162,426 | 11/1992 | Hazan | 525/101 |

*Primary Examiner*—John C. Bleutge
*Assistant Examiner*—D. R. Wilson
*Attorney, Agent, or Firm*—Chris P. Konkol

[57] ABSTRACT

A coating composition useful for a finish for automobiles and trucks in which the film forming binder comprises an acrylic polymer having at least two reactive anhydride groups, an epoxy-containing crosslinker, and an alkoxysilane copolymer. The composition may be used as a one-package system with a reasonable pot life. The composition is characterized by improved environmental resistance.

11 Claims, No Drawings

ANHYDRIDE EPOXY COATING COMPOSITION MODIFIED WITH A SILANE POLYMER

FIELD OF THE INVENTION

This invention is related to a coating composition comprising an anhydride-epoxy composition modified with a silane polymer.

BACKGROUND

There are a wide variety of multi-component coating compositions available for finishing automobiles and trucks. Various coating compositions comprising anhydride or epoxy containing compositions are known. For example, U.S. Pat. No. 4,906,677 discloses a composition comprising an acrylic anhydride polymer, a glycidyl component, and a phosphonium catalyst. European Patent Application 3,793 discloses a two component composition in which one component has an anhydride ring that is opened with an amine and a second component contains glycidyl groups. U.S. Pat. No. 3,136,736 and British patent 994,881 disclose coating compositions comprising polyepoxides and maleic anhydride copolymers. U.S. Pat. No. 4,732,791 concerns a coating composition comprising a polyepoxide, a monomeric anhydride curing agent, and a hydroxyl containing polyfunctional polymer.

A problem with present coating compositions for automobiles and trucks, or parts thereof, is that durability is not as good as desired. An important aspect of durability is environmental resistance. The present invention offers a high quality finish exhibiting superior environmental resistance. Another problem with epoxy-anhydride systems has been that, due to limited pot life, they have been used as a two package system, which packages are conventionally mixed shortly before use. The present composition is a potential one-package system. Such a coating composition exhibits excellent adhesion to the substrate to which it is applied, good outdoor weatherability, etch resistance, and gloss.

SUMMARY OF THE INVENTION

A coating composition containing 20–80% by weight of binder components and 80–20% by weight of solvent. The binder contains, as separate components, the following:
(a) an anhydride polymer having at least two anhydride groups and having a weight average molecular weight of about 2,000–50,000;
(b) an epoxy component having at least two reactive glycidyl groups; and
(c) an acrylosilane polymer.

In one embodiment of the present invention, the acrylosilane polymer is epoxy functional.

DETAILED DESCRIPTION OF THE INVENTION

The composition of the present invention forms a durable environmental resistant coating. The composition is especially useful for finishing the exterior of automobiles and trucks.

The composition can also be pigmented to form a colored finish, although the composition is particularly useful as a clearcoat.

Preferably, the coating composition has a high solids content and contains about 20–80% by weight binder and 20–80% by weight of organic solvent. The binder of the composition contains about 25–90%, preferably 35 to 65% by weight of binder, of an anhydride polymer containing at least two anhydride groups; 5–30%, preferably 10 to 20% by weight of binder, of a glycidyl containing component, and 5–30%, preferably 10–20% of an acrylosilane polymer which may or may not contain epoxy groups.

Optionally, the composition may comprise 5–50%, preferably 10 to 25% by weight of binder of an acrylic or a polyester or polyester urethane which may contain hydroxyl and/or acid functionality. If hydroxy functional, the hydroxy number is 20 to 120. If acid functional, the acid number is 20 to 120. The anhydride polymer employed in preparing the present composition has a weight average molecular weight of about 2,000–50,000, determined by gel permeation chromatography using polymethyl methacrylate as a standard. Preferably the anhydride polymer has a weight average molecular weight of 3,000–25,000.

The anhydride polymer may be prepared by conventional techniques in which the monomers, solvent, and conventional catalysts such as t-butyl perbenzoate are charged into a polymerization vessel and heated to about 75°–200° C. for about 0.5–6 hours to form the polymer.

The anhydride acrylic polymer is preferably an acrylic copolymer formed by polymerizing monomers of alkyl methacrylates, alkyl acrylates, or mixtures thereof, where the alkyl groups have 1–12 carbon atoms, and ethylenically unsaturated anhydrides (or ethylenically unsaturated dicarboxylic acids which are converted to the acid anhydride during the polymerization). Optionally, the anhydride acrylic polymer can contain other components such as styrene, methyl styrene, acrylonitrile, and/or methacrylonitrile in amounts of about 0.1–50% by weight.

Typical alkyl acrylates and methacrylates that can be used to form the anhydride acrylic polymer are methyl methacrylate, ethyl methacrylate, propyl methacrylate, butyl methacrylate, pentyl methacrylate, hexyl methacrylate, octyl methacrylate, decyl methacrylate, lauryl methacrylate, methyl acrylate, ethyl acrylate, propyl acrylate, butyl acrylate, octyl acrylate, nonyl acrylate, decyl acrylate, lauryl acrylate, and the like. Other components that can be used to form the anhydride acrylic polymer are acrylamide, methacrylamide, and the like. Also, the anhydride acrylic polymer can contain about 0.1–5% by weight of an ethylenically unsaturated acid such as acrylic acid, methacrylic acid, itaconic acid, maleic acid, and the like.

Typically useful ethylenically unsaturated anhydrides are itaconic anhydride, maleic anhydride, isobutenyl succinic anhydride, and the like. As stated above, it is also possible to impart the anhydride functionality to the anhydride acrylic polymer by using an ethylenically unsaturated dicarboxylic acid which converts to the acid anhydride during the reaction. Suitable ethylenically unsaturated dicarboxylic acids that can be used are itaconic acid, maleic acid, isobutenyl succinic acid, and the like.

A preferred anhydride is the reaction product of styrene, butyl methacrylate, butyl acrylate, and itaconic acid converted to an anhydride. Another preferred polymer comprises styrene, butyl methacrylate, butyl acrylate, and itaconic anhydride. Still another preferred polymer comprises butyl acrylate, styrene, maleic anhydride, and butyl methacrylate.

The epoxy component preferably contains at least two glycidyl groups and can be an oligomer or a polymer. Typical glycidyl components are sorbitol polyglycidyl ether, mannitol polyglycidyl ether, pentaerythritol polyglycidol ether, glycerol polyglycidyl ether, low molecular weight epoxy resins such as epoxy resins of epichlorohydrin and bisphenol A, di- and polyglycidyl esters of acids, polyglycidyl ethers of isocyanurates, such as Denecol EX301 ® from Nagase. Sorbitol polyglycidyl ethers, such as DCE-358 ® from Dixie Chemical Co., and di- and polyglycidyl esters of acids, such as Araldite CY-184 ® from Ciba-Geigy or XUS-71950 ® from Dow Chemical form high quality finishes. Cycloaliphatic epoxies such as CY-179 ® from Ciba-Geigy may also be used.

Glycidyl methacrylate or acrylate containing acrylic polymers can be used, such as random and block polymers of glycidyl methacrylate/butyl methacrylate. The block polymers can be prepared by anionic polymerization or by group transfer polymerization.

The silane polymers used in the present composition have a weight average molecular weight of about 1000–30,000, a number average molecular weight of about 500–10,000. (All molecular weights disclosed herein are determined by gel permeation chromatography using a polystyrene standard.)

A suitable silane polymer is the polymerization product of about 30–95% by weight ethylenically unsaturated non-silane containing monomers and about 5–70% by weight ethylenically unsaturated silane containing monomers, based on the weight of the organosilane polymer. Suitable ethylenically unsaturated non-silane containing monomers are alkyl acrylates, alkyl methacrylates and any mixtures thereof, where the alkyl groups have 1–12 carbon atoms, preferably 3–8 carbon atoms.

Suitable alkyl methacrylate monomers used to form an organosilane polymer are methyl methacrylate, ethyl methacrylate, propyl methacrylate, butyl methacrylate, isobutyl methacrylate, pentyl methacrylate, hexyl methacrylate, octyl methacrylate, nonyl methacrylate, lauryl methacrylate and the like. Similarly, suitable alkyl acrylate momomers include methyl acrylate, ethyl acrylate, propyl acrylate, butyl acrylate, isobutyl acrylate, pentyl acrylate, hexyl acrylate, octyl acrylate, nonyl acrylate, lauryl acrylate and the like. Cycloaliphatic methacrylates and acrylates also can be used, for example, such as trimethylcyclohexyl methacrylate, trimethylcyclohexyl acrylate, iso-butyl methacrylate, t-butyl cyclohexyl acrylate, or t-butyl cyclohexyl methacrylate. Aryl acrylate and aryl methacrylates also can be used, for example, such as benzyl acrylate and benzyl methacrylate. Of course, mixtures of the two or more of the above mentioned monomers are also suitable.

In addition to alkyl acrylates or methacrylates, other non-silane-containing polymerizable monomers, up to about 50% by weight of the polymer, can be used in an acrylosilane polymer for the purpose of achieving the desired physical properties such as hardness, appearance, mar resistance, and the like. Exemplary of such other monomers are styrene, methyl styrene, acrylamide, acrylonitrile, methacrylonitrile, and the like. Styrene can be used in the range of 0–50% by weight.

A suitable silane containing monomer useful in forming an acrylosilane polymer is an alkoxysilane having the following structural formula:

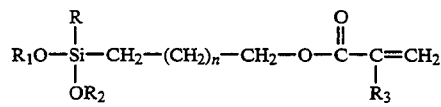

wherein R is either $CH_3$, $CH_3CH_2$, $CH_3O$, or $CH_3CH_2O$; $R_1$ and $R_2$ are $CH_3$ or $CH_3CH_2$; $R_3$ is either H, $CH_3$, or $CH_3CH_2$; and n is 0 or a positive integer from 1 to 10. Preferably, R is $CH_3O$ or $CH_3CH_2O$ and n is 1.

Typical examples of such alkoxysilanes are the acrylatoalkoxy silanes, such as gammaacryloxypropyltrimethoxy silane and the methacrylatoalkoxy silanes, such as gammamethacryloxypropyltrimethoxy silane, and gamma-methacryloxypropyltris(2-methoxyethoxy) silane.

Other suitable alkoxy silane monomers have the following structural formula:

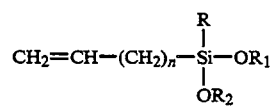

wherein R, $R_1$ and $R_2$ are as described above and n is a positive integer from 1 to 10.

Examples of such alkoxysilanes are the vinylalkoxy silanes, such as vinyltrimethoxy silane, vinyltriethoxy silane and vinyltris(2-methoxyethoxy) silane.

Other suitable silane containing monomers are acyloxysilanes, including acrylatoxy silane, methacrylatoxy silane and vinylacetoxy silanes, such as vinylmethyl diacetoxy silane, acrylatopropyl triacetoxy silane, and methacrylatopropyltriacetoxy silane. Of course, mixtures of the above-mentioned silane-containing monomers are also suitable.

Consistent with the above mentioned components of the silane polymer, an example of an acrylosilane polymer useful in the coating composition of this invention may contain the following constituents: about 15–25% by weight styrene, about 30–60% by weight methacryloxypropyltrimethoxy silane, and about 25–50% by weight trimethylcyclohexyl methacrylate.

One preferred acrylosilane polymer contains about 30% by weight styrene, about 50% by weight methacryloxypropyltrimethoxy silane, and about 20% by weight of nonfunctional acrylates or methacrylates such as trimethylcyclohexyl methacrylate, butyl acrylate, and iso-butyl methacrylate and any mixtures thereof.

Silane functional macromonomers also can be used in forming the silane polymer. These macromonomers are the reaction product of a silane-containing compound, having a reactive group such as epoxide or isocyanate, with an ethylenically unsaturated non-silane containing monomer having a reactive group, typically a hydroxyl or an epoxide group, that is co-reactive with the silane monomer. An example of a useful macromonomer is the reaction product of a hydroxy functional ethylenically unsaturated monomer such as a hydroxyalkyl acrylate or methacrylate having 1–4 carbon atoms in the alkyl group and an isocyanatoalkyl alkoxysilane such as isocyanatopropyl triethoxysilane.

Typical of such above mentioned silane functional macromonomers are those having the following structural formula:

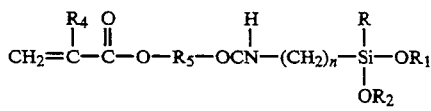

wherein R, R₁, and R₂ are as described above; R₄ is H or CH₃, R₅ is an alkylene group having 1-8 carbon atoms and n is a positive integer from 1-8.

Curing catalysts for catalyzing the crosslinking between silane moieties of a silane polymer and/or between silane moieties and other components of the composition include dibutyl tin dilaurate, dibutyl tin diacetate, dibutyl tin dichloride, dibutyl tin dibromide, triphenyl boron, tetraisopropyl titanate, triethanolamine titanate chelate, dibutyl tin dioxide, dibutyl tin dioctoate, tin octoate, aluminum titanate, aluminum chelates, zirconium chelate, and other such catalysts or mixtures thereof known to those skilled in the art. Tertiary amines and acids or combinations thereof are also useful for catalyzing silane bonding.

In one embodiment of the present invention, the silane polymer optionally also has epoxy groups, that is, a portion of the monomers reacted to form the polymer contain an epoxy group. An example of a suitable epoxy functional monomer is glycidyl methacrylate and the like. Suitably, the silane polymer may be the reaction product of a monomer mixture comprising up to 40% by weight of of an epoxy functional monomer, preferably 5 to 20%, and most preferably 10 to 15% by weight of an epoxy functional monomer. The use of an epoxysilane polymer improves the compatibility of the composition.

As indicated above, the binder of the present composition may comprise from about 5 to 50%, preferably 10 to 25%, based on the weight of the binder, of an acrylic or polyester or polyester urethane or copolymer thereof having a hydroxy number of about 20 to 120, preferably 70 to 100, or an acid number of about 20 to 120, preferably 75 to 95. This polymer has a weight average molecular weight of about 2,000 to 20,000, preferably 4,000–10,000.

Polyester urethanes are a reaction product of a hydroxyl terminated polyester component and a polyisocyanate component, preferably, an aliphatic or cycloaliphatic diisocyanate. A polyester, which may be used alone or as the polyester component of a polyester urethane, may be suitably prepared from linear or branched chain diols, including ether glycols, or mixtures thereof or mixtures of diols and triols, containing up to and including 8 carbon atoms, or mixtures of such diols, triols, and polycaprolactone polyols, in combination with a dicarboxylic acid, or anhydride thereof, or a mixture of dicarboxylic acids or anhydrides, which acids or anhydrides contain up to and including 12 carbon atoms, wherein at least 75% by weight, based on the weight of dicarboxylic acid, is an aliphatic dicarboxylic acid.

Representative saturated and unsaturated polyols that can be reacted to form a polyester include alkylene glycols such as neopentyl glycol, ethylene glycol, propylene glycol, butane diol, pentane diol, 1,6-hexane diol, 2,2-dimethyl-1,3-dioxolane-4-methanol, 1,4-cyclohexane dimethanol, 2,2-dimethyl 1,3-propanediol, 2,2-bis(-hydroxymethyl)propionic acid, and 3-mercapto-1,2-propane diol. Preferred are 1,6-hexanediol and butylene glycol.

Polyhydric alcohols, having at least three hydroxyl groups, may also be included to introduce branching in the polyester. Typical polyhydric alcohols are trimethylol propane, trimethylol ethane, pentaerythritol, glycerin and the like. Trimethylol propane is preferred, in forming a branched polyester.

Polycaprolacone polyols may be also be used in making the polyester. A preferred polycaprolactone, a triol, is Tone® FCP 310 (available from Union Carbide).

The carboxylic acids used in making the polyester component of the polyester urethane include the saturated and unsaturated polycarboxylic acids and the derivatives thereof. Aliphatic dicarboxylic acids that can be used to form the polyester are as follows: adipic acid, sebacic acid, succinic acid, azelaic acid, dodecanedioic acid, 1,3 or 1,4-cyclohexane dicarboxylic acid and the like. A preferred acid is adipic acid. Aromatic polycarboxylic acids include phthalic acid, isophthalic acid, terephthalic acid, and the like. Anhydrides may also be used, for example, maleic anhydride, phthalic anhydride, trimellitic anhydride, and the like.

Typical polyisocyanates that may be used to form the polyester urethane are as follows: isophorone diisocyanate which is 3-isocyanatemethyl-3,5,5-trimethyl- cyclohexyl-isocyanate, propylene-1,2-diisocyanate, butylene-1,2-diisocyanate, butylene-1,3-diisocyanate, hexamethylene diisocyanate, methyl-2,6-diisocyanate, methyl-2,6-diisocyanate caproate, octamethylene diisocyanate, 2,4,4-trimethylhexamethylene diisocyanate, nonamethylene diisocyante, 2,2,4-trimethylhexamethylene diisocyanate, decamethylene diisocyanate, 2,11-diisocyano-dodecane and the like, meta-phenylene diisocyanate, para-phenylene diisoxyanate, toluene-2,4-diisocyanate, toluene-2,6-diisocyanate, xylene-2,4-diisocyanate, xylene-2,6-diisocyanate, dialkyl benzene diisocyanates, such as methylpropylbenzene diisocyanate, methylethylbenzene diisocyanate, and the like: 2,2'-biphenylene diisocyanate, 3,3'-biphenylene diisocyanate, 4,4'-biphenylene diisocyanate, 3,3'-dimethyl-4,4'-biphenylene diisocyanate, and the like; methylene-bis(4-phenyl isocyanate), ethylene-bis(4-phenyl isocyanate), isopropylidene-bis(4-phenyl isocyanate), butylene-bis(4-phenylisocyanate), and the like; 2,2'-oxydiphenyl diisocyanate, 3,3'-oxydiphenyl diisocyanate, 4,4'-oxydiphenyl diisocyanate, 2,2'-ketodiphenyl diisocyanate, 3,3'-ketodiphenyl diisocyanate, 4,4'-ketodiphenyl diisocyanate, 2,2'-thiodiphenyl diisocyanate, 3,3'-thiodiphenyl diisocyanate, 4,4'-thiodiphenyl diisocyanate, and the like; 2,2'-sulfonediphenyl diisocyanate, 3,3'-sulfonediphenyl diisocyanate, 4,4'-sulfonediphenyl diisocyanate, and the like; 2,2,-methylene-bis(cyclohexyl isocyanate), 3,3'-methylene-bis(cyclohexyl isocyanate), 4,4'-methylene-bis(cyclohexyl isocyanate), 4,4'-ethylene-bis(cyclohexyl isocyanate), 4,4'-propylene-bis-(cyclohexyl isocyanate), bis(paraisocyano-cyclohexyl)sulfide, bis(para-isocyano-cyclohexyl)sulfone, bis(para-isocyano-cyclohexyl)ether, bis(para-isocyano-cyclohexyl)diethyl silane, bis(para-isocyano-cyclohexyl)diphenyl silane, bis(para-isocyano-cyclohexyl)ethyl phosphine oxide, bis(para-isocyano-cyclohexyl)phenyl phosphine oxide, bis(para-isocyano-cyclohexyl)N-phenyl amine, bis(para-isocyano-cyclohexyl)N-methyl amine, 3,3'-dimethyl-4,4'-diisocyano biphenyl, 3,3'-dimethoxy-biphenylene diisocyanate, 2,4-bis(b-isocyano-t-butyl)toluene, bis(para-b-isocyano-t-butylphenyl)ether, para-bis(2-methyl-4-isocyanophenyl)benzene, 3,3-diisocyano adamantane, 3,3-diisocyano biadamantane, 3,3-diisocyanoethyl-1'-biadamantane, 1,2- bis(3-isocyano-propoxy)ethane, 2,2-dimethyl propylene diisocyanate, 3-methoxy-hexamethylene diisocyanate 2,5-dimethyl heptamethylene diisocyanate, 5-methyl-nonamethylene diisocyanate, 1,4-diisocyano-cyclohexane, 1,2-diisocyano-octadecane, 2,5-diisocyano-1,3,4-oxadiazole, $OCN(CH_2)_3O(CH_2)_2O(CH_2)_3NCO$, $OCN(CH_2)_3NCO$ or the following:

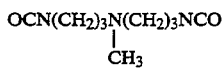

Aliphatic diisocyanates are preferred, forming urethanes that have excellent weatherability. One aliphatic diisocyanate that is particularly preferred is trimethyl hexamethylene diisocyanate.

A preferred polyester urethane is the reaction product of trimethylhexamethylene diisocyanate and a hydroxy terminated polyester of 1,3-butylene glycol, 1,6-hexanediol, adipic acid, trimethylolpropane, and Tone® FCP 310.

It is noted that a hydroxy functional polyester urethane can be convened to the corresponding acid functional polyester urethane by reaction with methylhexahydropthalic anhydride or other mono-anhydride such as succinic anhydride. Converting the hydroxy to the acid may result in longer pot life in the clearcoat.

A polyester may be prepared by conventional techniques in which the component polyols and carboxylic acids and solvent are esterified at about 110° C.–250° C. for about 1–10 hours to form a polyester. To form a polyester urethane, a diisocyanate may then be added and reacted at about 100° C. for about 15 minutes to 2 hours.

In preparing the polyester urethane, a catalyst is typically used. Conventional catalysts include benzyl trimethyl ammonium hydroxide, tetramethyl ammonium chloride, organic tin compounds, such as dibutyl tin diaurate, dibutyl tin oxide stannous octoate and the like, titanium complexes and litharge. About 0.1–5% by weight of catalyst, based on the total weight of the reactants, is typically used.

The stoichiometry of the polyester preparation is controlled by the final hydroxyl number and by the need to obtain a product of low acid number; an acid number below 10 is preferable. The acid number is defined as the number of milligrams of potassium hydroxide needed to neutralize a 1 gram sample of the polyester. Additional information on the preparation of polyester urethanes is disclosed in commonly assigned U.S. Pat. No. 4,810,759, hereby incorporated by reference.

An acid resin is optionally added to the coating composition to give improved color and longer pot life. It does this without adversely affecting the crosslinking between the anhydride and glycidyl components. The acid functional material can be formed by polymerizing monomers of alkyl methacrylates, or alkyl acrylates or mixtures thereof, where the alkyl groups have 1–12 carbon atoms and ethylenically unsaturated acids. Optionally, the acid functional polymer can also contain other components such as styrene, methyl styrene, and/or acrylonitrile, methacrylonitrile in amounts of about 0.1–50% by weight.

Typical alkyl acrylates, methacrylates, and other components that can be used to form the acid functional polymer are the same as those listed above with respect to the anhydride polymer Typically useful ethylenically unsaturated acids are acrylic acid, methacrylic acid, itaconic acid, maleic acid, and the like.

This acid resin may also contain hydroxyl functionality by using monomers such as hydroxyethylacrylate, hydroxyethyl methacrylate and hydroxypropyl acrylate. The hydroxy functionality may be introduced by a post reaction of the acid with epoxy containing compounds such as Cardura E® from Shell Chemical Company (a glycidyl ester of versatic acid) and propylene oxide.

Another optional component of the present composition is the half ester of an anhydride compound, as distinguished from a polymer, for example the reaction product of an acid anhydride such as hexahydropthalic anhydride or a succinic anhydride, which may be substituted, for example with a $C_1$–$C_8$ alkyl group, with a monofunctional or polyfunctional alcoholic solvent such as methanol or ethylene glycol. A preferred half ester is the reaction product of methylhexahydropthalic anhydride with an alcohol such as ethylene glycol. Other alcoholic solvents are propanol, isobutanol, isopropanol, tertiary butanol, n-butanol, propylene glycol monomethyl ether, ethylene glycol monobutyl ether, and the like. Such half esters are useful for boosting the solids content of the composition. More particularly, such a half ester is chosen to be a good solvent for the preferred phosphonium catalyst in admixture with the anhydride component. The half ester is suitably present in the amount of 2 to 25 percent by weight of binder, preferably 4–12 percent.

About 0.1–5% by weight, based on the weight of the binder of the coating composition, of a catalyst is added to enhance curing of the composition. Typical catalysts are as follows: triethylene diamine, quinuclidine, dialkyl alkanol amines such as dimethyl ethanolamine, diethyl ethanol amine, dibutyl ethanol amine, diethyl hexanol amine and the like, lithium tertiary butoxide, tri(dimethylaminomethyl)phenol, bis(dimethylamino)propan-2-ol, $N,N,N^1,N^1$-tetramethylethylenediamine, N-methyldiethanolamine, N,N-dimethyl-1,3-propanediamine and 1-dimethylamino-2-propanol or quaternary ammonium salts such as tert-butyl ammonium bromide, benzyl trimethyl ammonium formate and the like. Preferred catalyst, however, are phosphonium compounds such as are disclosed in U.S. Pat. No. 4,906,677, hereby incorporated by reference in its entirety. Suitable catalysts are benzyltriphenyl phosphonium chloride and tetrabutyl phoshphonium chloride.

Typical solvents for the coating composition include toluene, xylene, butyl acetate, ethyl benzene, higher boiling aromatic hydrocarbons, amyl acetate, ethyl acetate, propyl acetate, ethylene or propylene glycol mono alkyl ether acetates.

Generally, the present composition is applied as a coating to a substrate by conventional techniques such as spraying and electrostatic spraying. The composition may be applied as a one package system with a limited pot life. In such case, the composition should be essentially hydroxy free, with the hydroxyl number of the coating less than 10, preferably zero.

Alternatively, the composition can be applied as a two package, including polyols. In such a system, the epoxy and polyol components are separate from the anhydride component, the catalyst, and the optional acid component. The term "multi-package" means that at least some of the components are kept separate until shortly before their application.

The resulting coating can be dried and cured at elevated temperatures of 100° to 200° C. for a 2 package system and 120° to 200° C. for a one package system. Coatings are applied to form a finish typically about 0.5-5 mils thick, and preferably 1-2 mils thick.

To improve weatherability of the clear finish of the coating composition, about 0.1-5%, by weight, based on the weight of the binder, of an ultraviolet light stabilizer or a combination of ultraviolet light stabilizers can be added. These stabilizers include ultraviolet light absorbers, screeners, quenchers and specific hindered amine light stabilizers. Also, about 0.1-5% by weight, based on the weight of the binder, of an antioxidant can be added.

Typical ultraviolet light stabilizers that are useful are listed in U.S. Pat. No. 4,906,677, previously incorporated by reference. Particularly useful ultraviolet light stabilizers that can be used are hindered amines of piperidyl derivatives such as those disclosed in Murayama et al., U.S. Pat. No. 4,061,616, issued Dec. 6, 1977, column 2, line 65, through column 4, line 2, and nickel compounds such as [1-phenyl-3-methyl-4-decanoyl-pyrazolate(5)]-Ni, bis[phenyldithiocarbamato]-Ni(II), and others listed in the above patent, column 8, line 44 through line 55.

An applicable blend of ultraviolet light stabilizers comprises 2-[2'-hydroxy-3',5'-1(1-1-dimethyl-propyl)-phenyl]benzotrizole and bis-[4-(1,2,2,6,6-pentamethyl-piperidyl)]2-butyl-2-[(3,5-t-butyl-4-hydroxyphenyl)methyl]propanedioate. Although the stabilizers can be employed in any ratio, a 1:1 ratio of benzotriazole to propanedioate is preferred.

The composition can be pigmented to form a colored finish or primer. About 0.1-200% by weight, based on the weight of the binder, of conventional pigments can be added using conventional techniques in which a mill base containing pigment, dispersant and solvent is first formed. The mill base is then mixed with the composition to form a colored composition. This composition can be applied and cured as shown above.

In addition to the above-mentioned components, the composition preferably also comprises an agent to prolong pot life. Suitable agents include ethyl or methyl orthoformate and ethyl or methyl orthoacetate.

The present composition can be used in a one-package system with a pot life of several weeks depending on the conditions.

To improve the pot life or stability of the composition it is desirable to include a trialkyl orthoacetate or orthoformate, wherein the alkyl group has 1-6 carbon atoms. Preferred compounds are trimethyl or triethyl orthoacetate. A suitable range of such a stabilizer is 1 to 6% by weight of composition, preferably about 3 to 4 % by weight. Such a stabilizer also serves to keep the viscosity of the composition low.

The following examples illustrate the invention. All parts and percentages are on a weight basis unless otherwise indicated. The weight average molecular weight of polymers was determined by GPC (gel permeation chromatography) using polyethyl methacrylate as a standard, unless stated otherwise.

EXAMPLE 1

This example illustrates the preparation of an itaconic anhydride polymer, specifically a styrene/butyl methacrylate/butyl acrylate/itaconic acid (anhydride) copolymer in the weight ratio of 15/20/38/27. The anhydride polymer was first prepared, as follows. A reactor was loaded with, as Part I, 224.3 parts of xylene and heated to reflux temperature of 284° F. The following Part II was mixed, the itaconic added last, and then fed to the reactor simultaneously with Part III, but starting 5 minutes after the start of Part III, over a period of five hours while maintaining reflux.

|  | Parts by Weight |
|---|---|
| Part II |  |
| Styrene monomer | 87.8 |
| Butyl methacrylate monomer | 117.0 |
| Butyl acrylate | 222.3 |
| Xylene | 7.2 |
| Itaconic acid | 183.1 |
| Part III |  |
| Xylene | 35.8 |
| Tertiary butyl peroxyacetate | 29.2 |
| Xylene | 7.1 |

During the polymerization, water is formed by dehydration of the polymerized itaconic acid so the anhydride is formed. This water is continuously removed by the water separator distillation apparatus until a total of 11.8 parts of water per 100 parts itaconic acid is separated from the distillate. When the required amount of water has been stripped off, the reactor is cooled to 190°-210° F. and vacuum applied to remove xylene. Finally, 163.9 parts of PM acetate is added under nitrogen.

This polymer solution had a Gardner-Holdt viscosity of Y-$Z^2$ and a measured solids of 65.0%. The anhydride content was determined to be 2.0 Meq/gm and the acid content to be 0.7 Meq/gm. The molecular weight was measured by gel permeation chromatography to be $M_n=1800$ and $M_w=4200$.

EXAMPLE 2

This example illustrates the preparation of an acrylosilane polymer which may be employed in the present composition. The polymer is prepared by charging the following constituents into a polymerization reactor equipped with a heat source and a reflux condensor:

|  | Parts by Weight |
|---|---|
| Portion I |  |
| "Solvesso" 100 | 75.00 |
| Portion II |  |
| Methacryloxypropyltrimethoxy silane | 300.00 |
| Styrene monomer | 173.00 |
| Isobutyl methacrylate monomer | 103.86 |
| "Solvesso" 100 | 45.02 |
| Portion III |  |
| 2,2'-azobis(2-methyl)butanenitrile | 57.32 |
| "Solvesso" 100 | 85.80 |
| Total | 840.00 |

The "Solvesso" 100 is a conventional aromatic hydrocarbon solvent. Portion I is charged into the reactor and heated to its reflux temperature. Portion II, containing the monomers for the organosilane polymer, and Portion III, containing the polymerization initiator, are each premixed and then added simultaneously to the reactor while the reaction mixture is held at its reflux temperature. Portion II is added at a uniform rate over a 6 hour period and Portion II is added at a uniform rate over a 7 hour period. After Portion II is added, the reaction mixture is held at its reflux temperature for an additional hour. The resulting acrylosilane polymer solution is cooled at room temperature and filtered.

The resulting acrylosilane polymer solution has a polymer solids content of about 70%, the polymer has a weight average molecular weight of about 3,000, and has the following constituents: 30% styrene, 18% isobutyl methacrylate, and 52% methacryloxypropyl trimethoxysilane.

EXAMPLE 3

This example illustrates an epoxy silane polymer, more particularly an epoxy functional acrylosilane polymer which was prepared by charging the following constituents into a polymerization vessel equipped with a heating mantle, reflux condenser, thermometer, nitrogen inlet, and stirrer:

|  | Parts by Weight |
|---|---|
| Portion 1 | |
| Xylol (135-145° C.) | 363.2 |
| Aromatic 100 | 363.2 |
| Portion 2 | |
| Styrene | 530.9 |
| gamma-Methacryloxypropyl trimethoxy silane | 1380.3 |
| Methyl methacrylate | 318.5 |
| Butyl methacrylate | 79.6 |
| 2-Ethylhexyl acrylate | 79.6 |
| Glycidyl methacrylate | 265.4 |
| Aromatic 100 | 40.9 |
| Xylol | 40.9 |
| Portion 3 | |
| t-Butyl peroxyacetate | 132.7 |
| Aromatic 100 | 99.6 |
| Xylol | 99.7 |
| TOTAL | 3794.5 |

Portion 1 was charged into the polymerization vessel and heated under nitrogen to 149° C. Portion 2 was then added over 360 minutes and Portion 3 over 420 minutes to the vessel. The resulting polymer solution had the following characteristics:

| Gallon wt. | 8.56 lbs./gal. |
|---|---|
| % wt. solids | 72.2% |
| % volume solids | 68.6 |
| $M_w$ of polymer | 5000 |
| $M_n$ of polymer | 1650 |

The polymer composition was, by weight, 20 percent styrene, 52 percent gamma-methacrylooxylpropyl trimethoxy silane (A174), 12 percent methyl methacrylate, 3 percent butyl methacrylate, 3 percent 2-ethylhexyl acrylate, and 10 percent glycidyl methacrylate, represented as follows: STY/A174/MMA/BMA/2-EHA/GMA in the ratio of 20/52/12/3/3/10.

EXAMPLE 4

This example illustrates, as an optional component for a composition according to the present invention, a polyester urethane solution which may be prepared by charging the following constituents in order into a reaction vessel equipped with a stirrer, a heating source and a reflux condenser:

|  | Parts by Weight |
|---|---|
| Portion 1 | |
| 1,3-butylene glycol | 173.4 |
| 1,6-hexanediol | 163.1 |
| Trimethylol propane | 78.8 |
| Adipic acid | 403.7 |
| Toluene | 20.0 |
| Portion 2 | |
| Propylene glycol monomethyl ether acetate | 294.4 |
| Portion 3 | |
| Tone ® FCP 310 (caprolactone polyol from Union Carbide) | 934.9 |
| Propylene glycol monomethyl ether acetate | 185.3 |
| Hydrocarbon solvent | 706.1 |
| Portion 4 | |
| trimethylhexamethylene diisocyanate | 290.3 |
| dibutyl tin dilaurate | 0.5 |
| Portion 5 | |
| Hydrocarbon solvent | 69.8 |
| Total | 3320.3 |

Portion 1 is charged in order into the reaction vessel, and the constituents of Portion 1 are heated to distill water at 140°-230° C. The distillation is continued until the acid number is 6.5 to 8.5. The product is thinned and cooled to 98° to 102° C. by charging Portion 2 into the vessel. While the constituents in the vessel are maintained at the above temperature, Portion 3 was charged to the reactor in order. Portion 4 is added to the composition at a uniform rate over a 30 minute period while the batch temperature is maintained at 98°-102° C. A sample is removed and tested for unreacted isocyanate NCO by infrared analysis. The composition is held at the above temperature until there is no unreacted isocyanate in the composition. Portion 5 then is added as a rinse and the resulting composition was allowed to cool to ambient temperatures.

Following this procedure, the resulting composition had a polymer weight solids content of about 61.0%. The polyester urethane had a Gardner-Holdt viscosity of L. The $M_n$ (number average molecular weight) was 3734.0 and the $M_w$ (weight average molecular weight) was 7818.0 (by gel permeation chromatography using polystyrene as the standard). The acid content was determined to be 4.9 Meq/g. The hydroxy number was 92.

EXAMPLE 5

This example illustrates, as another optional component for use in the present composition, an acid polymer, more specifically a methacrylic acid resin, which may be prepared by charging the following constituents into a reactor equipped with a thermometer, stirrer, dropping funnel, and condensor:

|  | Parts by Weight |
|---|---|
| Portion 1 | |
| Propylene glycol monomethyl ether acetate | 155.3 |
| Xylene | 103.5 |
| Portion 2 | |
| Butyl methacrylate | 174.8 |
| Methacrylic acid | 97.1 |
| Butyl acrylate | 140.8 |
| Styrene | 72.8 |
| Portion 3 | |
| Tertiary butyl peroxy acetate | 35.0 |
| Propylene glycol monomethyl ether acetate | 41.7 |

-continued

| Component | Parts by Weight |
|---|---|
| Xylene | 27.8 |
| Total | 849.0 |

Portion 1 was charged into the reactor and heated to its reflux (approximately 140° C.). Portion 2 was premixed and added to the reactor dropwise over a 240 minute period. Portion 3 was premixed and added to the reactor over a 270 minute period concurrent with Portion 3. After the addition was complete, the reactor was held at reflux and filled out.

The resulting acid polymer composition had a composition of 15% styrene, 36% butyl methacrylate, 29% n-butyl acrylate, and 20% methacrylic acid. The solids content was 60% and the polymer had a Gardner-Holdt viscosity of Z-1. The polymer had a weight average molecular weight of 5000.

EXAMPLE 6

This example illustrates a clearcoat coating composition according to the present invention. The following was thoroughly blended:

| Component | Parts by Weight |
|---|---|
| Itaconic anhydride acrylic polymer (as described above) | 46.99 |
| PM acetate | 6.93 |
| Epoxy silane polymer (as described above) | 13.10 |
| XU-71950 (Diglycidyl ester from Dow) | 11.82 |
| Trimethyl orthoacetate | 2.66 |
| DISLON 1984 (50%) acrylic flow additive in xylene from King Industries | 0.23 |
| TINUVIN 384 (UV screener) | 1.01 |
| TINUVIN 123 (HALS) | 15.98 |
| Catalyst solution (25% tetrabutyl phosphonium chloride in PM acetate) | 0.53 |
| Butyl acetate | 15.98 |
| TOTAL | 100.00 |

In the above list, the catalyst solution refers to a solution of 25 % tetrabutyl phosphonium chloride, which was dissolved in PM acetate. The TINUVIN hindered amine light stabilizer (HALS) and UV screener are commercially available from Ciba-Geigy. The coating composition was sprayed onto primed metal panels coated with a basecoat and cured at 265° F. The coating exhibited excellent humidity resistance, chemical resistance, durability and other film properties.

Various modifications, alterations, additions, or substitutions of the components of the composition of this invention will be apparent to those skilled in the art without departing from the scope and spirit of this invention. This invention is not limited to the illustrative embodiments set forth herein, but rather the invention is defined by the following claims.

We claim:

1. A clearcoat composition comprising 20–80% by weight of reactive binder components and 80–20% by weight of an organic liquid carrier; wherein the binder comprises:

(a) 25–90% by weight, based on the weight of the binder, of an acrylic copolymer having at least two reactive anhydride groups and comprising polymerized monomers of an ethylenically unsaturated anhydride or an ethylenically unsaturated dicarboxylic acid, which has been converted to an anhydride, and polymerized monomers selected from the group consisting of alkyl methacrylate, alkyl acrylate and any mixtures thereof, wherein the alkyl groups have 1–8 carbon atoms and the polymer has a weight average molecular weight of about 2,000–50,000;

(b) 5–30% by weight, based on the weight of the binder, of a glycidyl ether or ester or cycloaliphatic epoxy compound containing at least two reactive glycidyl groups;

(c) 10–30% by weight, based on the weight of the binder, of an acrylosilane polymer which is the polymerization product of about 5–70% by weight ethylenically unsaturated alkoxysilane containing monomers, based on the weight of the polymer, and having a number average molecular weight of 500–10,000; and (d) an effective amount of a curing catalyst selected from the group consisting of tertiary amines, quaternary ammonium salts, and phosphonium compounds;

wherein components (a), (b) and (c) are different components.

2. The coating composition of claim 1, wherein the glycidyl component comprises a di- or polygylcidyl ether of a polyol or a di-or polyglycidyl ester of a di- or polycarboxylic acid.

3. The coating composition of claim 1 in which the glycidyl component is selected from the group consisting of a polyglycidyl ether of low molecular weight polyol, an epoxy resin of epichlorohydrin and bisphenol A, a polyglycidyl ester of polyacid, a polyglycidyl ether of isocyanurate, a glycidyl methacrylate or glycidyl acrylate containing acrylic polymer, and mixtures of any of the above.

4. The coating composition of claim 1, in which the anhydride acrylic polymer comprises polymerized monomers of styrene, alkyl methacrylate or an alkyl acrylate having 2–4 carbon atoms in the alkyl group, and ethylenically unsaturated anhydride or ethylenically unsaturated dicarboxylic acid converted to an anhydride.

5. The coating composition of claim 1, in which the anhydride acrylic polymer comprises polymerized monomers of butyl acrylate, styrene and itaconic acid converted to an anhydride.

6. The coating composition of claim 1, in which the anhydride acrylic polymer comprises polymerized units of maleic anhydride.

7. The composition of claim 1, further comprising an alkyl orthoacetate stabilizer.

8. The coating composition of claim 1, wherein the catalyst is a phosphonium compound.

9. The coating composition of claim 1, wherein component (c) further comprises epoxy groups resulting from polymerized units of one or more epoxy functional monomers.

10. A substrate coated with a cured layer of the composition of claim 1.

11. The substrate of claim 10, wherein said substrate is plastic or metal.

* * * * *